(12) United States Patent
Raphaeli et al.

(10) Patent No.: US 10,852,393 B2
(45) Date of Patent: Dec. 1, 2020

(54) METHOD OF CALIBRATING A RADAR SYSTEM

(71) Applicants: GM GLOBAL TECHNOLOGY OPERATIONS LLC, Detroit, MI (US); Silantrix Ltd., Kfar Saba (IL)

(72) Inventors: Dani Raphaeli, Kfar Saba (IL); Igal Bilik, Herzliya (IL); Oded Bialer, Herzliya (IL)

(73) Assignees: GM GLOBAL TECHNOLOGY OPERATIONS LLC, Detroit, MI (US); SILANTRIX LTD., Kfar Saba (IL)

( * ) Notice: Subject to any disclaimer, the term of this patent is extended or adjusted under 35 U.S.C. 154(b) by 366 days.

(21) Appl. No.: 16/049,373

(22) Filed: Jul. 30, 2018

(65) Prior Publication Data

US 2020/0033445 A1   Jan. 30, 2020

(51) Int. Cl.
| | | |
|---|---|---|
| *G01S 7/40* | (2006.01) | |
| *H01Q 21/00* | (2006.01) | |
| *H01Q 1/32* | (2006.01) | |
| *G01S 13/68* | (2006.01) | |
| *H01Q 1/38* | (2006.01) | |

(52) U.S. Cl.
CPC .............. *G01S 7/4026* (2013.01); *G01S 7/40* (2013.01); *G01S 13/68* (2013.01); *H01Q 1/3233* (2013.01); *H01Q 1/38* (2013.01); *H01Q 21/00* (2013.01); *G01S 2007/403* (2013.01); *G01S 2007/4034* (2013.01)

(58) Field of Classification Search
CPC .... G01S 7/40; G01S 7/4026; G01S 2007/403; G01S 2007/4034
See application file for complete search history.

(56) References Cited

U.S. PATENT DOCUMENTS

| | | | | |
|---|---|---|---|---|
| 2,713,161 | A * | 7/1955 | Fiske ..................... | H01Q 3/443 342/371 |
| 4,336,540 | A * | 6/1982 | Goodwin .............. | G01S 13/422 342/157 |
| 6,975,265 | B2 * | 12/2005 | Schlick ................. | G01S 7/4004 342/165 |
| 7,714,765 | B2 * | 5/2010 | Stickley ................ | H01Q 21/20 342/25 R |

(Continued)

*Primary Examiner* — Peter M Bythrow
(74) *Attorney, Agent, or Firm* — Lorenz & Kopf LLP

(57) ABSTRACT

A radar system and method for calibrating a radar system, the method including the steps of: measuring a set of azimuth angles of the radar system to obtain a plurality of measured azimuth array responses, wherein the radar system is physically rotated about a first axis of the radar system between each azimuth angle measurement; measuring a set of elevation angles of the radar system to obtain a plurality of measured elevation array responses, wherein the radar system is physically rotated about a second axis of the radar system between each elevation angle measurement; obtaining an azimuth calibration matrix based on the plurality of measured azimuth array responses and an elevation calibration matrix based on the plurality of measured elevation array responses; and configuring the radar system to apply the azimuth calibration matrix and the elevation calibration matrix to one or more antenna array responses.

14 Claims, 6 Drawing Sheets

(56) References Cited

U.S. PATENT DOCUMENTS

| | | | |
|---|---|---|---|
| 7,961,134 B2* | 6/2011 | Ranney | G06K 9/00711 |
| | | | 342/25 R |
| 8,248,298 B2* | 8/2012 | Lalezari | H01Q 21/24 |
| | | | 342/179 |
| 8,704,705 B2* | 4/2014 | Dougherty | G01S 7/4026 |
| | | | 342/169 |
| 10,446,938 B1* | 10/2019 | Wang | H01Q 21/0006 |
| 2004/0145513 A1* | 7/2004 | Katayama | G01S 7/35 |
| | | | 342/70 |
| 2006/0214835 A1* | 9/2006 | Lee | G01N 22/00 |
| | | | 342/22 |
| 2010/0141527 A1* | 6/2010 | Lalezari | H01Q 21/24 |
| | | | 342/368 |
| 2012/0206291 A1* | 8/2012 | Schuman | H01Q 21/205 |
| | | | 342/174 |
| 2014/0062762 A1* | 3/2014 | Kurono | G01S 7/4026 |
| | | | 342/146 |
| 2017/0090016 A1* | 3/2017 | Ikram | G01S 7/4004 |
| 2018/0120414 A1* | 5/2018 | Alcalde | G01S 13/42 |
| 2019/0086512 A1* | 3/2019 | Bilik | G01S 7/4026 |
| 2019/0120954 A1* | 4/2019 | Kim | B64C 39/024 |

* cited by examiner

METHOD OF CALIBRATING A RADAR SYSTEM

TECHNICAL FIELD

The present invention relates generally to radar systems, and more particularly, to methods of calibrating radar systems.

BACKGROUND

Many modern vehicles are equipped with advanced safety and driver-assist systems that require robust and precise object detection and tracking systems to control host vehicle maneuvers. These systems utilize periodic or continuous detection of objects and control algorithms to estimate various object parameters, such as the relative object range, velocity, direction of travel, and size. For example, radar devices detect and locate objects (i.e., targets), by transmitting electromagnetic signals that reflect off targets within the radar's field-of-view. The reflected signal returns to the radar as echoes where they are processed to determine various information such as the round-trip travel time of the transmitted/received signals.

Advanced radar systems in use today may utilize a multiple-input multiple-output (MIMO) concept that employs multiple antennas at the transmitter to transmit independent waveforms and multiple antennas at the receiver to receive the radar echoes. In a "co-located" MIMO radar configuration, the antennas in both the transmitter and the receiver are spaced sufficiently close so that each antenna views the same aspect of an object such that a point target is assumed. In the MIMO receiver, a matched filter bank is used to extract the waveform components. When the signals are transmitted from different antennas, the echoes of each signal carry independent information about detected objects and the different propagation paths. Phase differences caused by different transmitting antennas along with phase differences caused by different receiving antennas mathematically form a virtual antenna array that provides for a larger virtual aperture using fewer antenna elements. Conceptually, the virtual array is created by interleaving between each of the transmit antenna Tx and receiver antenna Rx such that the elements in the virtual array represent Tx-Rx pairs for each of the transmit antenna Tx and receive antenna Rx antennas in the MIMO array. For co-located MIMO antennas, a transmit array having N transmitter antennas and a receive array having M receive antennas produces a virtual array having M×N virtual receiver elements. In other words, the waveforms are extracted by the matched filters at the receiver such that there are a total of M×N extracted signals in the virtual array. The M×N virtual receiver elements can be used to create a beamforming image.

When an antenna array is manufactured, certain aspects of the radar configuration, such as predetermined values used in the creation of the beamforming image, may need to be adjusted or calibrated in order to achieve the desired level of accuracy in a particular radar configuration. Two-dimensional (2D) MIMO radars can measure an antenna array response at a particular azimuth angle and a particular elevation angle. Conventional calibration processes measure calibration values for each azimuth-elevation angle pair, which can be an intensive process when the number of azimuth and/or elevation angles to be measured is large.

SUMMARY

According to one aspect, there is provided a method of calibrating a radar system, the radar system comprises a transmit antenna array having a plurality of transmit antennas and a receive antenna array having a plurality of receive antennas, the plurality of transmit antennas are spaced along a transmit antenna array axis and the plurality of receive antennas are spaced along a receive antenna array axis that is perpendicular to the transmit antenna array, the method including the steps of: measuring a set of azimuth angles of the radar system to obtain a plurality of measured azimuth array responses, wherein the radar system is physically rotated about a first axis of the radar system between each azimuth angle measurement; measuring a set of elevation angles of the radar system to obtain a plurality of measured elevation array responses, wherein the radar system is physically rotated about a second axis of the radar system between each elevation angle measurement; obtaining an azimuth calibration matrix based on the plurality of measured azimuth array responses and an elevation calibration matrix based on the plurality of measured elevation array responses; and configuring the radar system to apply the azimuth calibration matrix and the elevation calibration matrix to one or more antenna array responses.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The radar system and calibration method described herein provide for calibration of a two-dimensional radar so that target object parameters can be calculated with improved accuracy. A two-dimensional radar is any radar that can be used to measure properties of more than one dimension regarding a target object not including range information. In many embodiments, these two dimensions can be referred to as azimuth and elevation. Generally speaking, the calibration method is carried out after manufacturing of the radar under controlled conditions. The calibration method includes measuring an antenna array response for each of a plurality of azimuth angles and, separately, for each of a plurality of elevation angles. For example, the radar array is positioned at a first azimuth angle (with the elevation angle set to 0° or another constant value) and then a transmit signal is transmitted from the transmit antenna array and an antenna array response is received at the receive antenna array after having reflected off an object at a known position. Next, the radar array is positioned (or rotated) to a second azimuth angle and then a transmit signal is transmitted and a response is received in a like manner. This process is carried out until all azimuth angles have been measured and, after all azimuth angles have been measured, the radar is rotated or positioned to a first elevation angle (with the azimuth angle set to 0° or another constant value) and measured. This is carried out for all elevation angles. Using the measurements for all of the azimuth and elevation angles are measured (e.g., 2000 in the case with the number of elevation angles J=1000 and the number of azimuth angles I=1000), an azimuth calibration matrix $C_{az}$ and an elevation calibration matrix $C_{el}$ are derived from the responses that were received at each of the azimuth angles and each of the elevation angles. These calibration matrices $C_{az}$, $C_{el}$ are then applied to antenna array responses received during use of the antenna, such as when the radar is installed in a vehicle and used for vehicle operation.

For example, after the calibration process, which may be carried out as a part of the manufacturing process (at least in many embodiments), the radar can be installed into a vehicle. During operation of the vehicle, the radar can be used for object detection and for obtaining two-dimensional (2D) information, such as azimuth and elevation information. In one scenario, the radar can transmit a transmit signal $X_T$ from the transmit antenna array and then receive a response $X_R$ to the transmit signal at the receive antenna array (i.e., the antenna array response). The azimuth and elevation calibration matrices $C_{az}$, $C_{el}$ can then be applied to this antenna array response $X_R$ to obtain a calibrated response matrix, which can represent a (or be used to derive a) 2D beamforming image.

Figure 1:
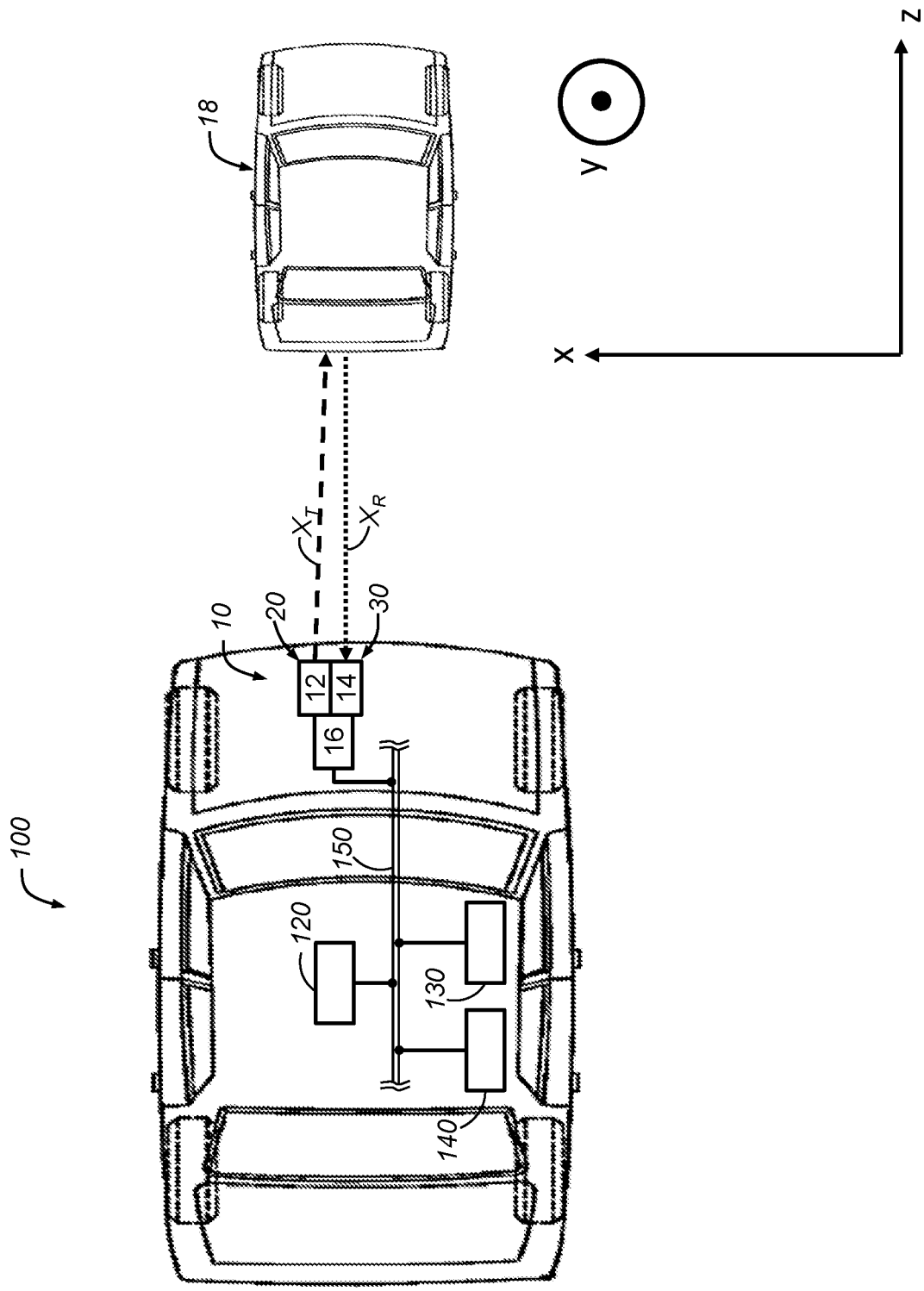
FIG. 1 is a schematic block diagram of a host vehicle and a target object, where the host vehicle includes an example of a vehicle radar system.

The radar system and method described below are directed to a multiple-input multiple-output (MIMO) radar system and a method for calibrating the radar system. FIG. 1 illustrates one possible architecture for a MIMO vehicle radar system 10 that can be used to implement the disclosed method. While the approach and methodology described herein relate to the radar configuration shown in FIG. 1, one of ordinary skill in the art will appreciate that vehicle radar system 10 is merely one example, and in many ways, the schematic block diagrams of these figures have been simplified for ease of explanation. Other configurations and embodiments may certainly be used instead, as the vehicle radar system and method described herein represent just one possible example. Moreover, the radar system can be incorporated into many other systems or devices, as the vehicular application of the radar system 10 is merely but one example.

The vehicle radar system 10 may be a MIMO system that includes a transmitter 12, a transmit antenna array 20 with a number of transmit antennas $Tx_1$ to $Tx_N$ (with N equal to the number of transmit antennas) (FIG. 2), a receiver 14, a receive antenna array 30 with a number of receive antennas $Rx_1$ to $Rx_M$ (with M equal to the number of receive antennas) (FIG. 2), a radar control module 16, as well as any other suitable hardware, firmware, software and/or other components that are useful for operation of such a system. According to one example, the transmitter 12 is communicatively coupled to a transmit antenna array 20 having N transmit antennas $Tx_1$ to $Tx_N$ configured to create a sensor field-of-view that monitors a particular zone of interest. The transmit antenna array 20 is configured to transmit electromagnetic signals $X_T$ (one shown, although N electromagnetic signals can be transmitted, one from each transmit antenna) that reflect off one or more target objects 18 within the field-of-view of the vehicle radar system 10. Although the radar 10 is illustrated in the drawings as being mounted on the front of the host vehicle and pointed in the vehicle forward direction, this is not necessary. For instance, the radar 10 could be mounted at a location other than on the front of the host vehicle, it may include a different number of transmit and/or receive antennas, and it could be oriented in a different direction.

The transmitter 12 may be a stand-alone module or unit; it may be part of a larger module, unit, system, etc.; it may include a number of sub-modules, sub-units, sub-systems, etc.; or it may be configured according to some other arrangement or architecture so long as it is configured to generate electromagnetic signals for transmission over the transmit antenna array 20 in accordance with the method disclosed herein. In one non-limiting example, the transmitter 12 includes a baseband processor that is configured to manage radio operations, including the generation of signals for transmission using the antenna array 20. The baseband processor can include hardware, firmware and/or software typically found on such transmitters, including random access memory (RAM, including static RAM (SRAM) and dynamic RAM (DRAM)) or other types of memory, including flash memory, other solid state memory, or other suitable memory. In other embodiments, the baseband processor of the transmitter 12 is included in a radar control module 16. The transmitter 12 can include waveform generators, oscillators, amplifiers, mixers, combiners, filters, converters and/or processors, to name just a few possible components. By way of example only, a waveform generator may be configured to generate waveforms or signals having different pulse widths, different waveform types and/or different pulse repetition intervals (PRI) within a given coherent processing interval (CPI). The waveforms or signals may then be digitized by a digital to analog (D/A) converter and up converted to a radio frequency carrier using an up converter. The up converter can consist of intermediate frequency (IF) and/or radio frequency (RF) oscillators, filters and/or synchronizing circuits. A transmit amplifier may then generate a transmit signal, which can be fed to a circulator or similar device. Again, this is only one possible configuration for transmitter 12, as numerous other configurations certainly are possible.

Figure 2:
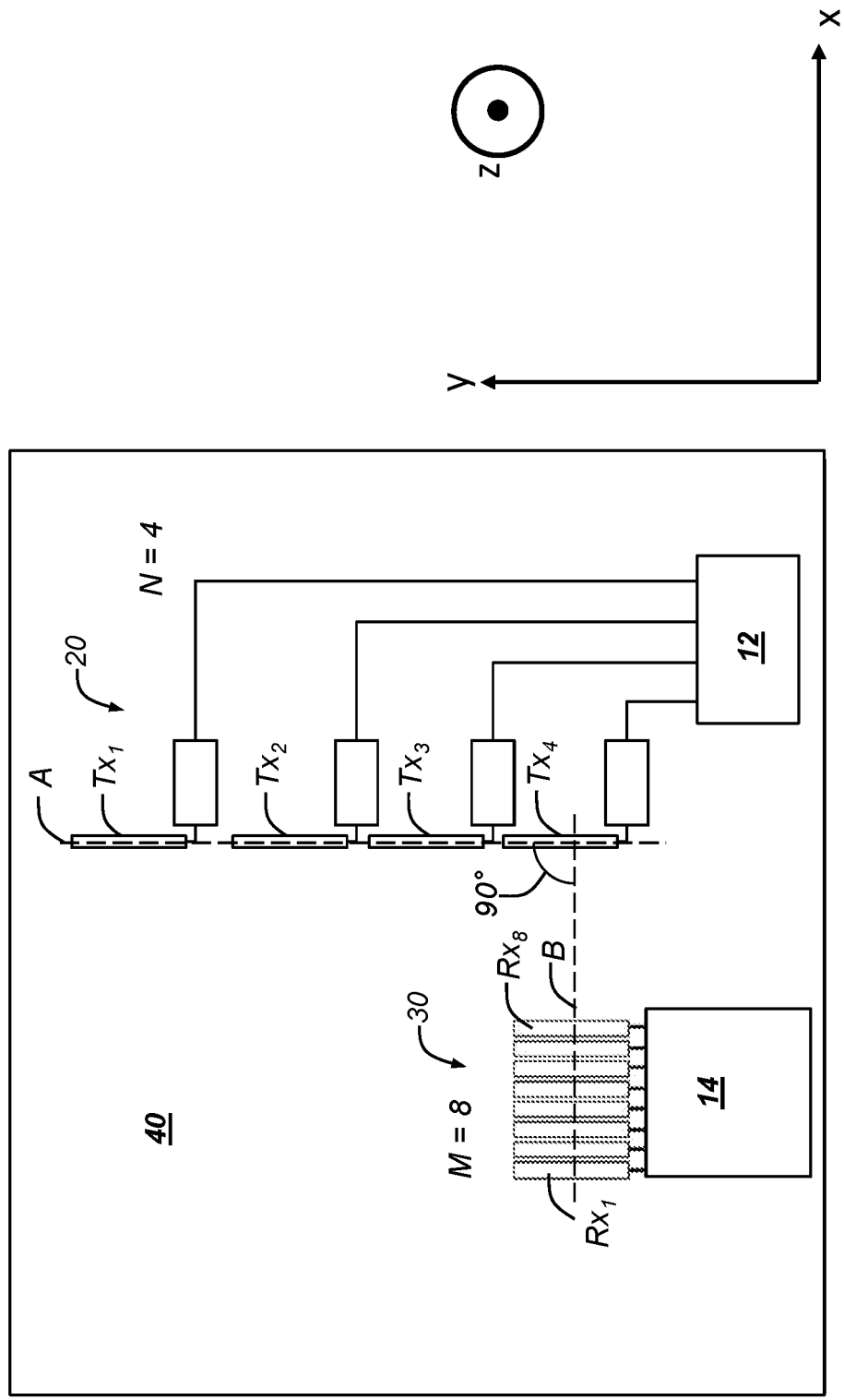
FIG. 2 is a schematic block diagram of a radar system including a receiver antenna array and a transmitter antenna array.

The receiver 14 is configured to process and extract information from the reflected signals or echoes that relates to the target object 18 such as, for example, its range, azimuth or azimuth angle, elevation or elevation angle, and range rate or velocity. Reflected signals $X_R$ (one shown, although M electromagnetic signals can be received, one at each receive antenna) reflect off the target object 18 and are received as echoes by the receive antenna array 30 having M receive antennas $Rx_1$ to $Rx_M$ (FIG. 2). The receiver 14 may be a stand-alone module or unit; it may be part of a larger module, unit, system, etc. (e.g., the receiver may be part of radar control module 16, it may be part of a module, unit, system, etc. that also includes the transmitter 12, etc.); it may include a number of sub-modules, sub-units, sub-systems, etc.; or it may be configured according to some other arrangement or architecture so long as it is configured to process electromagnetic signals received by the receive antenna array 30 in accordance with the method disclosed herein. According to a non-limiting example, the receiver 14 includes hardware, firmware and/or or software typically found on receivers such as, without limitation, amplifiers, mixers, de-mixers, oscillators, combiners, filters, and converters. The functions performed by receiver 14 may vary, but generally include performing various filtering, amplification, conversion and digitizing functions, as well as signal processing functions like analyzing various properties of the signals and waveforms to determine information such as phase, frequency, and amplitude. As understood by those skilled in the art, the techniques used to extract this information from the signals and waveforms can vary, but may include without limitation, in-phase and quadrature analysis and frequency domain analysis using Fourier transforms. In one embodiment, the receiver 14 may also include components to perform pulse compression and clutter rejection (e.g., Doppler filtering) functions. In at least one embodiment, the transmitter 12 and/or receiver 14 includes a combination of radio receiver circuitry that is configured to carry out the signal processing functionality described herein, such as that described in method 200 (FIG. 5) and/or method 300 (FIG. 6).

In one embodiment, the receiver 14 may include a baseband processor, such as the one discussed above with respect to transmitter 12. And, in some embodiments, the transmitter 12 and the receiver 14 can share a common baseband processor, such as one that is included as a part of the radar control module 16. For example, all or certain portions of the receiver 14 can be integrated into the radar control module 16, along with all or certain portions of the transmitter 12. The receiver 14 and/or the radar control module 16 can include a radio chipset that includes an integrated circuit and that is connected to or includes a processor and memory. The receiver 14 and/or radar control module 16 can also include certain components or circuitry configured to interface the radio chipset and circuitry with a vehicle communication system so that the radar 10 can communicate with other components, modules and/or systems located throughout the host vehicle and beyond. For example, it is possible for the radar 10 to be part of the host vehicle's electronics so that the vehicle radar system can communicate with other vehicle system modules 140 over a central vehicle communication bus 150.

In one particular embodiment, the radar 10 is implemented on a host vehicle 100, and the transmitter 12, the receiver 14, and/or the radar control module 16 is part of a vehicle control module installed on the host vehicle. The control module may include any variety of electronic processing devices, memory devices, input/output (I/O) devices, and/or other known components, and may perform various control and/or communication related functions. Depending on the particular embodiment, the control module may be a stand-alone vehicle electronic module, it may be incorporated or included within another vehicle electronic module (e.g., a steering control module, brake control module), or it may be part of a larger network or system (e.g., autonomous driving system, a traction control system (TCS), electronic stability control (ESC) system, antilock brake system (ABS), driver assistance system, adaptive cruise control system, lane departure warning system), to name a few possibilities. Such a control module is not limited to any one particular embodiment or arrangement.

Additionally, a vehicle electronics system can include various vehicle modules, including an engine control unit (ECU) 120, an onboard computer 130, and other VSMs 140. The ECU 120 can be used to control various aspects of engine operation such as fuel ignition and ignition timing. The ECU 120 is connected to communications bus 150 and may receive operation instructions from a body control module (BCM) (not shown) or other VSMs, including onboard computer 130. The ECU 120 may control an internal combustion engine (ICE) and/or electric propulsion motors (or other primary mover(s)).

Onboard computer 130 is a vehicle system module that includes a processor and memory. Additionally, at least in some embodiments, onboard computer 30 can be an infotainment unit (e.g., infotainment head unit, in-car entertainment (ICE) unit, in-vehicle infotainment (IVI)), a vehicle head unit, a center stack module (CSM), or vehicle navigation module. The processor can be used to execute various types of digitally-stored instructions, such as software or firmware programs stored in memory, which enable the computer 130 to provide a wide variety of services. In one embodiment, the processor can execute programs or process data to carry out at least a part of the method discussed herein. For example, the processor can receive signals or data from various vehicle system modules (e.g., VSM 140), including sensor data. In a particular embodiment, the onboard computer 130 can determine when to initiate the method 300 (discussed below in FIG. 4). For example, the onboard computer 130 can receive sensor data from a vehicle sensor (e.g., a camera, radar, lidar, or other sensor installed on the vehicle) and, based on the received sensor data, it can be determined that velocity information (and/or other information, including spatial information) is desired regarding a target object 18. Such information may be desirable when, for example, the vehicle is carrying out autonomous and/or semi-autonomous operations.

As mentioned, at least in some embodiments, the radar control module 16 includes a processor and memory and, in some embodiments, transmitter 12 and/or receiver 14 include a processor and memory. The processor can be any type of device capable of processing electronic instructions including microprocessors, microcontrollers, host processors, controllers, vehicle communication processors, and application specific integrated circuits (ASICs). The memory may include RAM, other temporary powered memory, any non-transitory computer-readable medium (e.g., EEPROM), or any other electronic computer medium that stores some or all of the software needed to carry out the various radio and/or signal processing functions discussed herein.

FIG. 2 illustrates a particular embodiment of the radar 10, and includes four transmit antennas (N=4) and eight receive antennas (M=8). This results in a virtual antenna array having M×N virtual receiver elements (M×N=32 in the illustrated example). The transmit antennas $Tx_1$ to $Tx_4$ can be designed and/or configured to transmit signals $X_T$ in a direction generally parallel to the bore-site of the radar 10 (along the z-axis). The receive antennas $Rx_1$ to $Rx_8$ can be designed and/or configured to receive an antenna array response $X_R$, which can be a transmit signal $X_T$ that reflected off an object. The transmit antenna array 20 and the receive antenna array 30 are mounted on a printed computer board (PCB) 40. The PCB 40 can include other electronic/hardware components that are not shown, but that are described above, as well as other radar components as appreciated by those skilled in the art.

The transmit antenna array 20 includes a plurality of transmit antennas $Tx_1$ to $Tx_4$ (N=4) that are physically separated from one another along the y-axis, but that are lined up (or aligned) with one another with respect to the x-axis. In one embodiment, each of the transmit antennas can be used to separately send a transmit signal, such as at a different time, at a different frequency, or modulated using different codes. The transmit antennas can share the same transmitter circuitry or may each include their own transmitter circuitry. In particular, each transmit antenna can be elongated (or at least include an elongated portion) and the elongated portion can run parallel to the axis along which the transmit antenna elements are separated (e.g., the y-axis in the illustrated embodiment). In one embodiment, the plurality of transmit antennas $Tx_1$ to $Tx_4$ can be aligned with one another with respect to the z-axis as well as the x-axis. The axis upon which the transmit antennas $Tx_1$ to $Tx_4$ are spaced (e.g., the y-axis in the illustrated embodiment) is referred to as the transmit antenna array axis A. In at least one embodiment, each of the transmit antennas along the transmit antenna array axis A (or y-axis in the illustrated embodiment) does not have to be evenly spaced from one another. For example, as shown in FIG. 2, the spacing between the first transmit antenna $Tx_1$ and the second transmit antenna $Tx_2$ is larger than the spacing between the other consecutive transmit antennas; however, in other embodiments, the transmit antennas are evenly spaced along the transmit antenna array axis A.

The receive antenna array 30 includes a plurality of receive antennas $Rx_1$ to $Rx_8$ (M=8) that are physically separated from one another along the x-axis, but that are lined up (or aligned) with one another with respect to the y-axis. In particular, each receive antenna can be elongated (or at least include an elongated portion) and the elongated portion can run parallel to the axis along which the receive antenna elements are aligned (e.g., the y-axis in the illustrated embodiment). In one embodiment, the plurality of receive antenna elements $Rx_1$ to $Rx_8$ can be aligned with one another with respect to the z-axis as well as the y-axis. The axis upon which the receive antenna elements $Rx_1$ to $Rx_8$ are spaced (e.g., the x-axis in the illustrated embodiment) is referred to as the receive antenna array axis B. In many embodiments, the receive antenna array axis B is perpendicular or orthogonal to the transmit antenna array axis A, such as is shown in FIG. 2. In at least one embodiment, each of the receive antennas along the receive antenna array axis B (or x-axis in the illustrated embodiment) does not have to be evenly spaced from one another. However, in other embodiments, the receive antennas are evenly spaced along the receive antenna array axis B. In the illustrated embodiment, the bore-site of the radar 10 is along the z-axis. The radar 10 can be mounted on a vehicle such that this bore-site faces an area in front of the vehicle, to the side of the vehicle, or to the rear of the vehicle. In the embodiment of FIG. 1, the radar 10 is mounted such that the bore-site faces an area in front of the vehicle.

In addition to the illustrated embodiment of the radar 10 as shown in FIG. 2, other antenna array configurations are possible. For example, the transmit antenna array 20 can be positioned to the left side of the receive antenna array 30 (with respect to the x-axis). In other embodiments, the receive antenna array 30 can be positioned below the transmit antenna array 20 or above the transmit antenna array 20 (with respect to the y-axis). And, in yet another embodiment, the receive antenna array 30 can be positioned at a different position along the z-axis than the transmit antenna array 20. Moreover, in other embodiments, the transmit antenna array 20 and the receive antenna array 30 can be swapped such that the transmit antenna array 20 runs along (or is spaced along) the x-axis and the receive antenna array 30 runs along (or is spaced along) the y-axis. However, in many embodiments, the transmit antenna array axis is perpendicular or orthogonal to the receive antenna array axis.

Figure 3:
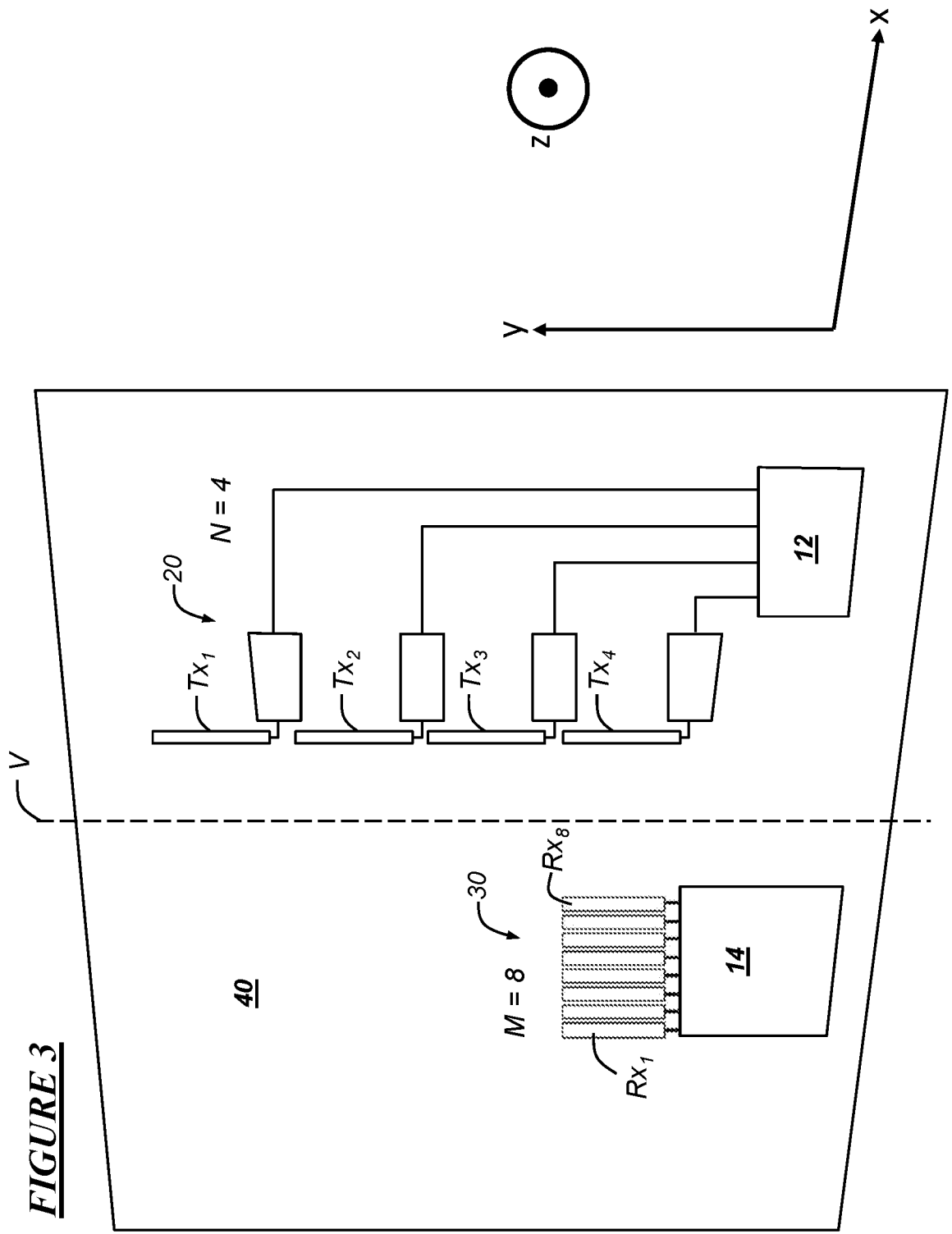
FIG. 3 is a schematic block diagram of the radar system of FIG. 2, where the radar is angled at a first azimuth angle $Az_i$.
Figure 4:
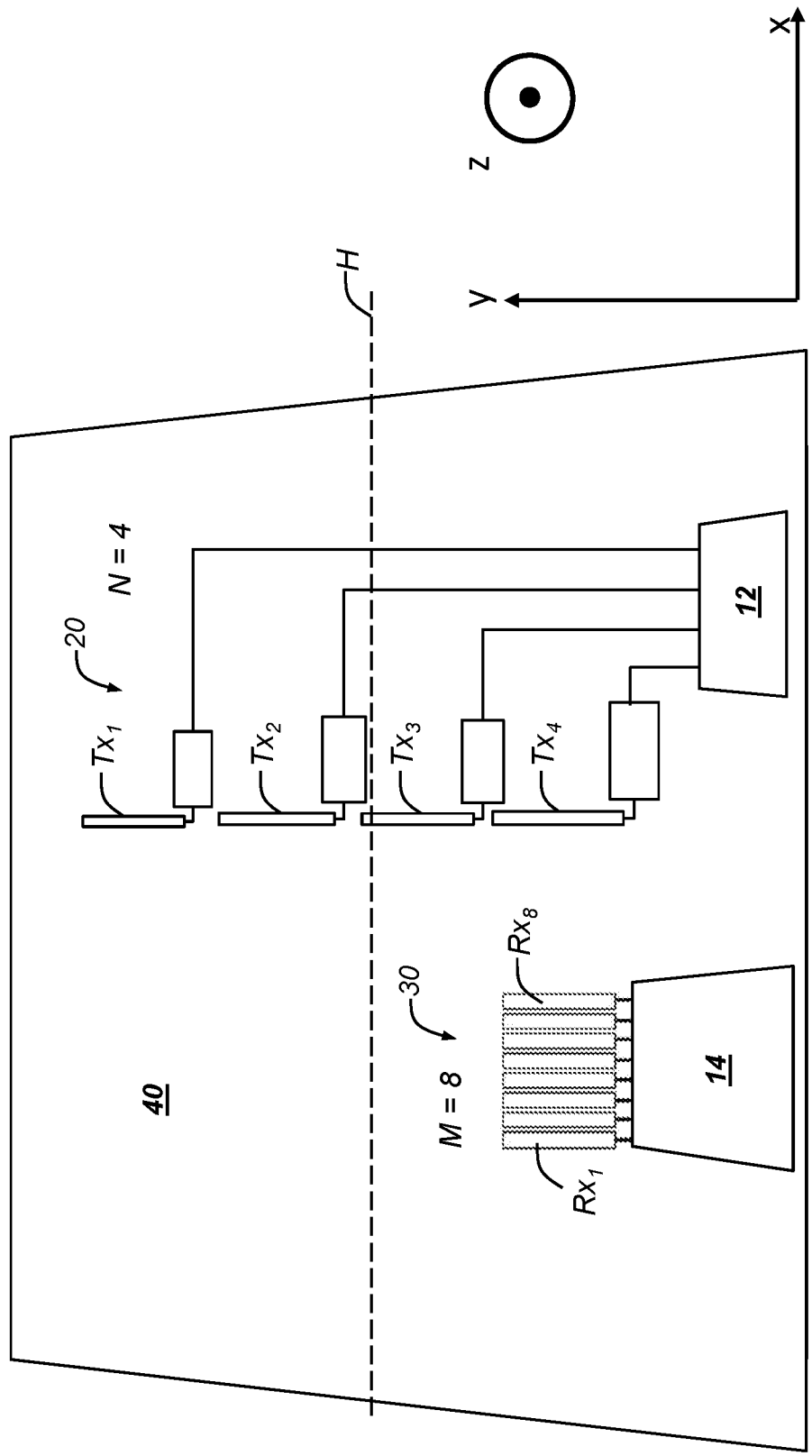
FIG. 4 is a schematic block diagram of the radar system of FIG. 2, where the radar is angled at a first elevation angle $El_j$.

FIG. 3 illustrates the radar 10 of FIG. 2 that is disposed at an azimuth angle $Az_i$. As shown, the radar 10 is angled about the central vertical axis V, which runs parallel to the y-axis. FIG. 4 illustrates the radar 10 of FIG. 2 that is disposed at an elevation angle $El_j$. As shown, the radar 10 is angled about the central horizontal axis H, which runs parallel to the x-axis.

Figure 5:
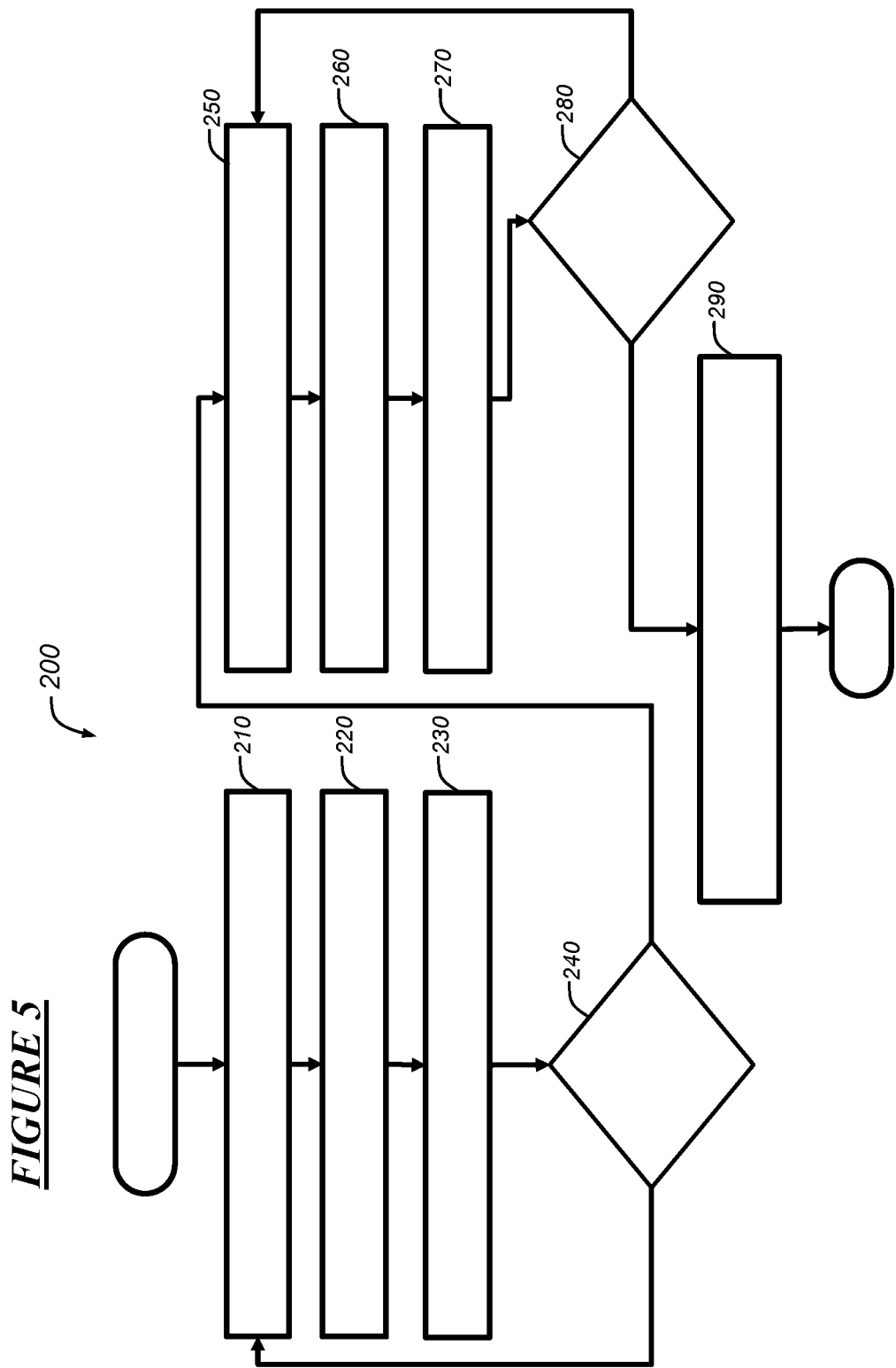
FIG. 5 is a flow chart depicting an example of a method for calibrating a vehicle radar system.
Figure 6:
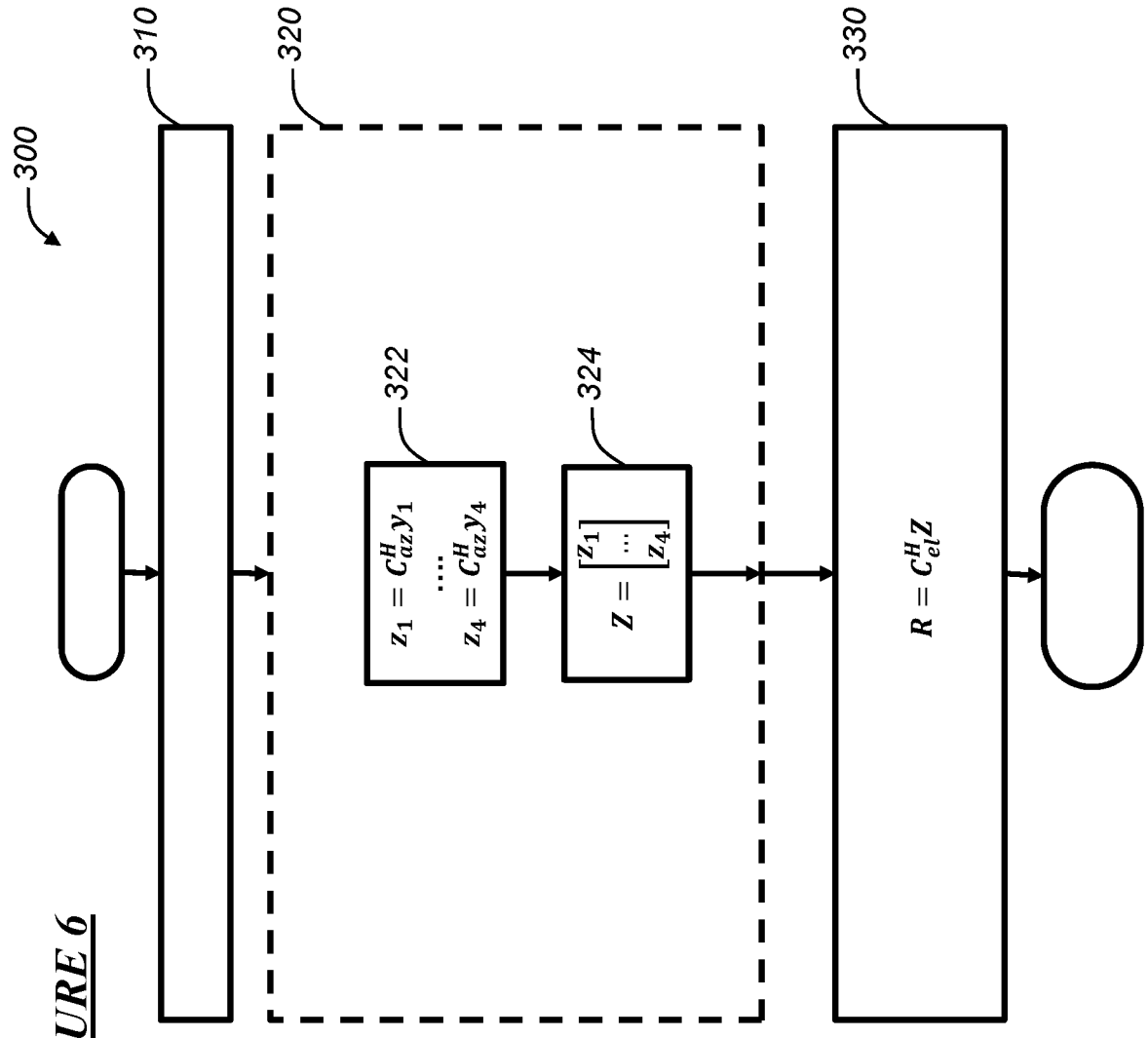
FIG. 6 is a flow chart depicting an embodiment of obtaining a calibrated array response using the calibrated values that are obtained as a result of a radar calibration process.

FIG. 5 illustrates a flow chart depicting an exemplary method 200 of calibrating a radar so that more accurate information regarding target objects can be obtained. According to one example, method 200 implements a calibration measurement process that measures a set of azimuth angles $Az_i$ and a set of elevation angles $El_j$. Based on antenna responses at each of the azimuth angles and each of the elevation angles, calibration matrices are obtained that can be used to calibrate the radar system so that a more accurate beamforming image can be obtained. It should be understood that it is not necessary for the steps in method 200 to be performed in the particular order or sequence shown and described, and that the steps can be carried out in any technically-feasible order.

In one embodiment, method 200 may be carried out as a part of a radar manufacturing process and can be referred to as an initial radar calibration process. For example, the radar components can be manufactured and attached to the PCB 40 (FIG. 2). Then, once all the hardware is manufactured and installed as a part of the radar 10, the method 200 can be carried out to obtain calibration matrices. Then, after the calibration matrices are obtained, the radar 10 can be configured to apply these calibration matrices to receive antenna responses that are obtained when the radar is in use (i.e., used for object detection, such as after the radar is installed in a vehicle). In other embodiments, the method 200 can be carried out at a later time, such as a time after the radar has already been in use. For example, a user of the radar may determine that the radar should be recalibrated and, at that time, the method 200 can be used to recalibrate the radar 10. The aforementioned examples only represent some of the instances in which the method 200 can be used, as other instances and use cases exist as well.

Beginning with step 210, the radar array is rotated along the azimuth plane (plane of x and z axes (FIG. 2)) with the elevation angle $\Phi_{el}=0°$. During the first occurrence or instance of step 210, no such rotation may be necessary as the radar 10 may already be positioned at a first azimuth angle. In one embodiment, the radar 10 can be rotated using an electromechanical angling device onto which the radar 10 is mounted. The electromechanical angling device can be a device that is configured to physically engage and hold the radar 10 and that can be electronically controlled to position the radar 10 at a desired azimuth angle, a desired elevation angle, or a combination thereof. The electromechanical angling device can use one or more electronically-controlled pneumatic pistons that can angle the radar 10 about the vertical axis V and the horizontal axis H. For example, a known object can be positioned in front of the radar 10. The azimuth angle can correspond to an angle between the bore-site of the radar 10 and the known object. In a first instance of step 210, the azimuth angle $Az_1$ may be 0° or another initial value. This first angle $Az_1$ can correspond to the orientation with respect to FIG. 2. During a subsequent instance of this step, the radar 10 is rotated about the vertical axis V (or other axis that is parallel to the transmit antenna array axis A). For example, the perspective view of FIG. 3 shows the radar 10 disposed at a second (or different) azimuth angle $Az_2$. Once the radar 10 is positioned at the desired azimuth angle (with the elevation angle being equal to 0° or other known constant value), the method 200 continues to step 220.

In step 220, transmit signal $X_T$ is transmitted from a single transmit antenna Tx. As depicted in FIG. 2, the radar 10 includes four transmit antennas $Tx_1$ through $Tx_4$ (with N=4) and eight receive antennas $Rx_1$ through $Rx_8$ (with M=8). In one embodiment, the radar 10 transmits the transmit signal $X_T$ from the transmit antenna $Tx_1$. The transmit signal $X_T$ can be generated using the transmitter 12 using those techniques described above and/or known to those skilled in the art. According to one such technique, a waveform generator in the transmitter 12 generates a transmit signal $X_T$ in the form of a baseband signal that is centered around a carrier frequency. The transmit signal $X_T$ may have a bandwidth corresponding to linear frequency modulation (LFM) chirps or pulses, for example. The transmit signal $X_T$ can be any appropriate or suitable modulated signal or waveform for use with the vehicle radar system 10, including modulated signals having a center frequency that is between 10 and 100 GHz. The method 200 continues to step 230.

In step 230, a receive response $X_{R,az,i}$ is received at one of the receive antennas Rx. In one embodiment, the receive response $X_{R,az,i}$ includes information representing a signal received at each receive antenna element after the transmit signal $X_T$ has reflected off of a target object with a known position at an azimuth angle $Az_i$. Thus, in the first iteration of step 230, a receive response $X_{R,az,i}$ is received. For example, the receive response $X_{R,az,i}$ includes information concerning the first transmit antenna $Tx_1$ and each of the receive antennas $Rx_1$ through $Rx_8$ when the azimuth angle is $Az_i$; thus, the receive response $X_{R,az,i}$ is an M×1 matrix (e.g., 8×1 matrix). As mentioned above, the target object can be placed at a known location, such as along the bore-site of the radar array, which is the z-axis with respect to the radar array of FIG. 2. The transmit signal $X_T$ reflects off of the target object and is received at each one of the receive antennas $Rx_1$ through $Rx_8$. Thus, in one example where the radar 10 with M=8 is used, a total of 8 signals are received at the receive antenna array 30, all of which together comprise the receive response $X_{R,az,i}$ and all of which were transmitted from the single transmit antenna $Tx_1$. The receive response $X_{R,az,i}$ for the present example is a vector with 8 rows and a single column. The method 200 continues to step 240.

In step 240, it is determined whether all of the azimuth angles are measured. For example, the calibration measurement process can be used to measure I azimuth angles $Az_i$ (where i is the index of the azimuth angle being measured, with i=1 through I) and to measure J elevation angles $El_j$ (where j is the index of the elevation angle being measured, with j=1 through J). In one embodiment, the number of azimuth angles can be 1000 (I=1000) and the number of elevation angles can be 1000 can be 1000 (J=1000). Thus, in such an embodiment, a total of 1000 transmit signals $X_T$ are transmitted from the transmit antenna array 20 (e.g., from the single transmit antenna $Tx_1$) and a total of 8000 reflected signals are received since each one of the transmit signals $X_T$ is received at each of the 8 receive antennas. In other embodiments, the number of azimuth angles is less than the number of elevation angles (I<J), or the number of azimuth angles is greater than the number of elevation angles (I>J). The number of azimuth angles I and the number of elevation angles J can be set based on the radar configuration, the desired accuracy, the field of view of the radar 10, as well as various other factors. When all I azimuth angles have been measured (e.g., steps 210 through 230 have been carried out for all I azimuth angles), the method 200 continues to step 250; otherwise, the method 200 continues back to step 210.

In the case that the method 200 continues back to step 210, then the radar 10 is rotated to another azimuth angle. For example, during a second iteration of the steps 210 through 230 (where i=2), a second azimuth angle $Az_2$ is measured to obtain a second azimuth receive response $X_{R,az,2}$. This process (i.e., steps 210 through 230) is carried out until all/azimuth angles are measured. All of these receive responses $X_{R,az,1}$ to $X_{R,az,1000}$ are then aggregated or combined into a single azimuth calibration matrix $C_{az}$, which is a 8×1000 matrix (or an M×I matrix). This azimuth calibration matrix $C_{az}$ can also be referred to as the overall measured azimuth array response, and each column of this matrix $C_{az}$ corresponds to information regarding a single azimuth angle $Az_i$. In one embodiment, each of the receive responses $X_{R,az,1}$ to $X_{R,az,I}$ can be included in a single column of the azimuth calibration matrix $C_{az}$ and, thus, in this embodiment, the azimuth calibration matrix $C_{az}$ is an M×I matrix (e.g., 8×1000 when using the radar 10 (with M=8) to measure 1000 azimuth angles (I=1000)).

In step 250, the radar array is rotated along the elevation plane (plane of y and z axes (FIG. 2)) with the azimuth angle $\theta_{ei}=0°$. This step is similar in nature to step 210, except that the radar is rotated to a desired elevation angle (with the azimuth angle $\theta_{ei}=0°$) instead of rotating the radar 10 to a desired azimuth angle. For example, the electromechanical angling device discussed above can be used to rotate the radar 10 along the elevation plane (i.e., the plane of the y and z axes). The elevation angle can correspond to an angle between the bore-site of the radar 10 and the known object. In a first instance of step 250, the elevation angle $El_1$ may be 0° or another initial value. This first angle $El_1$ can correspond to the orientation with respect to FIG. 2. During a subsequent instance of this step, the radar 10 is rotated about the horizontal axis H (or other axis that is parallel to the receive antenna array axis B). For example, the perspective view of FIG. 3 shows the radar 10 disposed at a second (or different) elevation angle $El_2$. The method 200 continues to step 260.

In step 260, a transmit signal $X_T$ is transmitted from each transmit antenna Tx. The transmit signal $X_T$ can be transmitted from each of the transmit antennas Tx at different times using a time division modulation technique, such as time-division multiple access (TDMA). In an alternative embodiment, the signal $X_T$ is sent from each of the transmit antennas Tx at the same time through use of other modulation techniques, such as code-division multiple access (CDMA) or frequency-division multiple access (FDMA). In any event, when using the radar array with N=4, a total of 4 transmit signals $X_T$ are transmitted during a single instance of step 260. The method 200 continues to step 270.

In step 270, an elevation receive response $X_{R,el,j}$ is received at one of the receive antennas Rx. In one embodiment, the elevation receive response $X_{R,el,j}$ includes each transmit signal $X_T$ after the signal $X_T$ has reflected off of a target object with a known position and at the elevation angle $El_j$. Each of the transmit signals $X_T$ reflect off of the target object and are received at a single one of the receive antennas, such as at $Rx_1$. It should be appreciated that while electromagnetic signals may contact the other receive antennas ($Rx_2$ through $Rx_4$), the radar 10 may not sample or otherwise listen for electromagnetic activity from these other receive antennas. When using the radar 10 with N=4, a total of 4 signals are received at the receive antenna $Rx_1$, all of which together comprise the elevation receive response $X_{R,el,j}$. In the first instance of step 270, j=1 such that the elevation receive response $X_{R,el,1}$ is received. The elevation receive response $X_{R,el,j}$ for the present example is a vector with 4 rows and a single column. The method 200 continues to step 280.

In step 280, it is determined whether all of the elevation angles are measured. For example, the calibration measurement process can be used to measure J number of elevation angles $El_j$ (where j is the index of the elevation angle being measured, with j=1 through J). As mentioned above, in one embodiment, the number of elevation angles can be 1000 (J=1000). Thus, in such an embodiment, a total of 4000 transmit signals $X_T$ are transmitted from the transmit antenna array (e.g., 1000 from each transmit antenna) and a total of 4000 reflected signals are received at the receive antenna array 30. When all J elevation angles have been measured (e.g., steps 250 through 270 have been carried out at all J elevation angles), the method 200 continues to step 290; otherwise, the method 200 continues back to step 250 until all J elevation angles are measured.

In the case that the method 200 continues back to step 250, then the radar 10 is rotated to another elevation angle. For example, during a second iteration of the step 250 (where j=2), a second elevation angle $El_2$ is measured to obtain a second elevation receive response $X_{R,el,2}$. This process (i.e., steps 250 through 270) is carried out until all J elevation angles are measured. All of these receive responses $X_{R,el,1}$ to $X_{R,el,1000}$ are then aggregated or combined into a single elevation calibration matrix $C_{el}$, which is a 4×1000 matrix (or an N×J matrix). Each column of the elevation calibration matrix $C_{el}$ corresponds to information regarding a single elevation angle $El_j$.

In step 290, the radar is configured to apply the calibration matrices to receive antenna responses so that a calibrated response is obtained. This step can include storing the calibration matrices in memory of the radar 10, such as memory of the radar control module 16. Additionally or alternatively, computer instructions can be generated that, when executed, calculate calibrated array responses by applying information contained in the calibration matrices to the received antenna array responses. In one embodiment, the radar 10 is configured such that the radar 10 carries out the steps of the method 300 below using the obtained calibration matrices.

FIG. 6 illustrates a flow chart depicting an exemplary method 300 of calibrating a radar response using calibration matrices. According to one example, method 300 implements a response calibration process that applies the calibration matrices $C_{az}$ and $C_{el}$ to a receive antenna response. The receive antenna response can be obtained through transmitting one or more transmission signals using the transmitter and, then, receiving the receive antenna response at the receive antenna array. In many scenarios, the receive antenna response is the reflected transmission signals. The method 300 can be used to calibrate the receive antenna response so that a more accurate beamforming image can be obtained. It should be understood that it is not necessary for the steps in method 300 to be performed in the particular order or sequence shown and described, and that performance of some or all of the steps in an alternative order is certainly possible.

The method 300 may be initiated or started in response to any number of different events, circumstances, scenarios, conditions, etc. For example, method 300 may begin when the host vehicle 100 is turned on (e.g., when the vehicle ignition is energized and starts the vehicle) or put in drive, and then the method could continuously, periodically, intermittently or otherwise run in the background. In another example, the method 300 may be started whenever certain vehicle functions or features that require input from the vehicle radar system 10 are engaged or otherwise activated (e.g., when one or more autonomous or semi-autonomous driving features are activated). It is also possible for the method 300 to be initiated on a periodic or routine basis (e.g., once a minute, hour, day, week, month, etc.). The aforementioned examples only represent some of the ways that method 300 can be initiated or started, as other ways, like a manual initiation of the calibration method, exist as well.

Beginning with step 310, a receive array response is received at the receive antenna array. In many embodiments, the receive antenna response is obtained through transmitting a transmit signal $X_T$ from each of the transmit antennas $Tx_1$ through $Tx_4$. According to one such technique, a waveform generator in the transmitter 12 generates a transmit signal $X_T$ in the form of a baseband signal that is centered around a carrier frequency. The transmit signal $X_T$ may have a bandwidth corresponding to linear frequency modulation (LFM) chirps or pulses, for example. The transmit signal $X_T$ can be any appropriate or suitable modulated signal or waveform for use with the vehicle radar system 10, including modulated signals having a center frequency that is between 10 and 100 GHz. Various communication access schemes can be used, including time difference multiple access (TDMA), code division multiple access (CDMA), binary phase modulation (BPM), code division multiplexing (CDM), orthogonal frequency division multiplexing (OFDM), and other suitable techniques.

The transmit signals $X_T$ are then each received at each of the receive antennas $Rx_1$ to $Rx_8$ of the receive antenna array 30. The entire receive array response $X_R$, which includes information pertaining to each transmitter-receiver channel (e.g., a total of 32 channels where N=8 and M=4), can then be processed to obtain transmitter-specific responses $y_1$ to $y_N$ (e.g., a total of four transmitter-specific responses $y_1$ to $y_4$ where N=4). Each of these transmitter-specific responses includes information pertaining to a single transmitter. For example, the transmitter-specific response $y_1$ includes information of the receive array response $X_R$ that was obtained from a channel of the first transmit antenna $Tx_1$. In this way, each of the transmitter-specific responses includes M rows and, in the case of the illustrated radar 10 of FIG. 2, each transmitter-specific responses thus includes 8 rows (and is an 8×1 matrix). Once all of the transmitter-specific responses $y_1$ to $y_N$ are obtained, the method 300 continues to step 320.

In step 320, the focused array azimuth energy is calculated. The focused array azimuth energy can be represented by Z, which can be calculated as explained below. In sub-step 322, the azimuth calibration matrix $C_{az}$ is applied to each of the transmitter-specific responses $y_1$ to $y_N$. In one embodiment, the following equation is used to apply the azimuth calibration matrix $C_{az}$ is applied to each of the transmitter-specific responses $y_1$ to $y_N$:

$$z_n = C_{az}^H y_n$$

where $z_n$ is the transmitter-specific focused array azimuth energy matrix (or "transmitter-specific azimuth energy matrix" for short), n represents the transmitter index (which ranges from 1 to N), $C_{az}^H$ is the conjugate transpose of the azimuth calibration matrix $C_{az}$, and $y_n$ is the transmitter-specific response from the n-th transmit antenna. For example, with reference to the illustrated radar 10 (FIG. 2) where M=8 and N=4, four transmitter-specific azimuth energy matrices $z_1$ through $z_4$ are obtained using the four transmitter-specific responses $y_1$ to $y_4$. Also, assuming that the number of calibrated azimuth angles I=1000, the dimensions of each transmitter-specific response $y_n$ is 8×1 and the dimensions of the conjugate-transpose azimuth calibration matrix $C_{az}^H$ is 1000×8. Thus, each of the four transmitter-specific azimuth energy matrices $z_n$ is 1000×1. Once each of the transmitter-specific azimuth energy matrices $z_1$ through $z_N$ are obtained, the method 300 continues to sub-step 324.

In sub-step 324, all of the transmitter-specific azimuth energy matrices $z_1$ through $z_N$ are aggregated into a single matrix. In one embodiment, the following equation is used:

$$Z = \begin{bmatrix} z_1^T \\ \ldots \\ z_N^T \end{bmatrix}$$

where Z is the focused array azimuth energy matrix (or "overall azimuth energy matrix"), and $z_n^T$ is the transpose of the transmitter-specific azimuth energy matrix for the n-th transmit antenna (e.g., $z_1^T$ is the transpose of the transmitter-specific azimuth energy matrix for the first transmit antenna $Tx_1$ (FIG. 2)). As mentioned above, in one embodiment, each transmitter-specific azimuth energy matrix $z_n$ is an I×1 matrix, where I is the number of azimuth angles used during the calibration process (e.g., I=1000). For example, where I=1000, each transmitter-specific azimuth energy transpose matrix $z_n^T$ is a 1×1000 matrix and, thus, the overall azimuth energy matrix Z is an N×J matrix (e.g., a 4×1000 in the case of four transmit antennas and 1000 azimuth angles). The method 300 continues to step 330.

In step 330, the calibrated array response is obtained. The calibrated array response can be represented by the azimuth and elevation focused energy matrix R. In many embodiments, the calibrated array response is obtained by applying the overall azimuth energy matrix Z to the elevation calibration matrix $C_{el}$ that was obtained as a part of the calibration measurement process of the method 200 (FIG. 2). In one embodiment, the following equation can be used to obtain the azimuth and elevation focused energy matrix R:

$$R = C_{el}^H Z$$

where $C_{el}^H$ is the conjugate transpose of the elevation calibration matrix $C_{el}$, and Z is the overall azimuth energy matrix. As mentioned above, when using the radar 10 of FIG. 2 where N=4 and M=8 to measure 1000 elevation angles (J=1000), the transmit elevation matrix $C_{el}$ is a 4×1000 (N×J) matrix and, thus, the conjugate transpose of the elevation calibration matrix $C_{el}$ is a 1000×4 (J×N) matrix. And, as mentioned above, using this same example, the overall azimuth energy matrix Z is a 4×1000 matrix. Thus, the resulting azimuth and elevation focused energy matrix R (or calibrated response matrix R) is a 1000×1000 matrix (i.e., a J×I matrix).

After the calibrated response matrix R is calculated or otherwise obtained, the calibrated response matrix R (or other information pertaining thereto or derive therefrom) can be sent to other vehicle system modules (VSMs), such as ECU 120, onboard computer 130, and/or other VSMs 140. Additionally, velocity and range information can be sent along with the azimuth and elevation of the target object to other VSMs. This information can be used for various vehicle operations, such as providing notifications to a vehicle operator or passenger and/or carrying out various semi-autonomous or fully-autonomous vehicle functionality. The method 300 may end at this point or loop back for continued execution.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of calibrating a radar system, the radar system comprises a transmit antenna array having a plurality of transmit antennas and a receive antenna array having a plurality of receive antennas, the plurality of transmit antennas are spaced along a transmit antenna array axis and the plurality of receive antennas are spaced along a receive antenna array axis that is perpendicular to the transmit antenna array, the method comprising the steps of:
measuring a set of azimuth angles of the radar system to obtain a plurality of measured azimuth array responses, wherein the radar system is physically rotated about a first axis of the radar system between each azimuth angle measurement;
measuring a set of elevation angles of the radar system to obtain a plurality of measured elevation array responses, wherein the radar system is physically rotated about a second axis of the radar system between each elevation angle measurement;
obtaining an azimuth calibration matrix based on the plurality of measured azimuth array responses and an elevation calibration matrix based on the plurality of measured elevation array responses; and
configuring the radar system to apply the azimuth calibration matrix and the elevation calibration matrix to one or more antenna array responses.

2. The method of claim 1, wherein the first axis is perpendicular to the second axis, and wherein the first axis corresponds to a vertical axis and the second axis corresponds to a horizontal axis of the radar system.

3. The method of claim 1, wherein the measuring steps both include using an electromechanical angling device to position the radar system at an angle to be measured.

4. The method of claim 1, wherein, during the measuring of the set of azimuth angles, the radar system is kept at a constant elevation angle, and wherein, during the measuring of the set of elevation angles, the radar system is kept at a constant azimuth angle.

5. The method of claim 1, wherein a single one of the measuring steps includes transmitting a transmit signal from a single transmit antenna of the plurality of transmit antennas and receiving the transmit signal at each of the plurality of receive antennas.

6. The method of claim 5, wherein another one of the measuring steps includes transmitting a transmit signal from each of the plurality of transmit antennas and receiving the transmit signals at a single one of the plurality of receive antennas.

7. The method of claim 1, wherein the configuring step includes storing the azimuth calibration matrix and the elevation calibration matrix in memory of the radar system.

8. The method of claim 1, wherein the radar system is installed in a vehicle, and wherein the method is carried out prior to installation of the radar system in the vehicle.

9. The method of claim 1, further comprising the steps of
receiving a first one of the one or more antenna array responses using the receive antenna array;
calculating a focused array azimuth energy matrix using the azimuth calibration matrix and the first antenna array response; and
obtaining a calibrated antenna array response using the focused array azimuth energy matrix and the elevation calibration matrix.

10. The method of claim 9, wherein the calculating step includes separating the first antenna array response into a plurality of transmitter-specific antenna array responses, and then using the radar system to execute a first equation as follows:

$$z_n = C_{az}^H y_n$$

where $z_n$ is an n-th transmitter-specific azimuth energy matrix, $C_{az}^H$ is a conjugate transpose of the azimuth calibration matrix, and $y_n$ is an n-th transmitter-specific response from the plurality of transmitter-specific antenna array responses, and wherein the first equation is carried out N times to obtain a plurality of transmitter-specific azimuth energy matrices $z_1$ to $z_N$, where N is a total number of transmit antennas of the transmit antenna array.

11. The method of claim 10, wherein the calculating step further comprises using the radar system to execute a second equation as follows:

$$R = C_{el}^H Z$$

where R is the calibrated antenna array response, $C_{el}^H$ is a conjugate transpose of the elevation calibration matrix, and Z is an overall azimuth energy matrix, the overall azimuth energy matrix Z being comprised of the plurality of transmitter-specific azimuth energy matrices $z_1$ to $z_N$.

12. The method of claim 1, wherein the plurality of transmitting antennas are aligned with respect to a third axis and fourth axis, wherein both the third axis and the fourth axis are orthogonal to the transmit antenna array axis.

13. The method of claim 1, wherein the radar system is a multiple input multiple output (MIMO) radar system mounted on a vehicle.

14. The method of claim 13, wherein the radar system further comprises a printed circuit board (PCB) upon which the transmit antenna array and the receive antenna array are disposed.

* * * * *